(No Model.)
J. H. FELTHOUSEN.
BICYCLE.
No. 561,214.
Patented June 2, 1896.
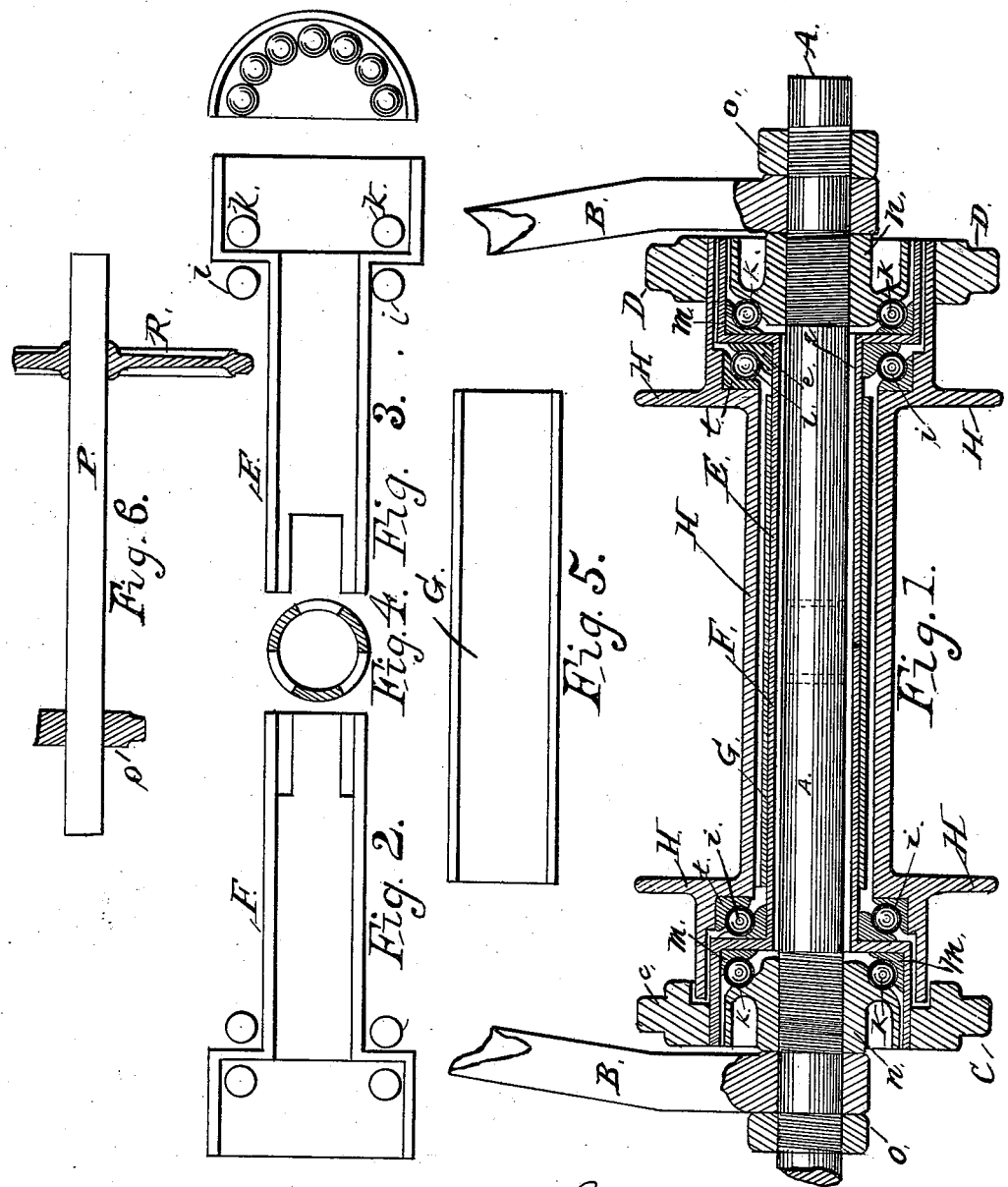
WITNESSES
J. M. Cooke
A. B. Jarrel
John Halman Felthousen
INVENTOR
BY
H. Ashton Ramsay.
ATTORNEY.
ANDREW B.GRAHAM. PHOTO-LITHO. WASHINGTON. D.C.

UNITED STATES PATENT OFFICE.

JOHN HALMAN FELTHOUSEN, OF SPRINGFIELD, OHIO.

BICYCLE.

SPECIFICATION forming part of Letters Patent No. 561,214, dated June 2, 1896.

Application filed September 9, 1895. Serial No. 561,953. (No model.)

*To all whom it may concern:*

Be it known that I, JOHN HALMAN FELTHOUSEN, a citizen of the United States, residing at Springfield, in the county of Clark and State of Ohio, have invented a new and useful Improvement in Bicycles, of which the following is a description.

My invention relates to improvements in bicycles, having for its object the reduction of friction at the bearings, and thus enabling the bicycle to be propelled with less power and greater speed. I attain these objects by the mechanism illustrated in the accompanying drawings, in which—

Figure 1 is a section cut longitudinally and vertically through the axle of my improved bicycle, showing the compound journals, bearings, inner and outer sleeves, sprocket-wheels, nuts, and antifriction-balls, all in their proper relative places. Figs. 2 and 3 are views of the clutch-sleeves carrying the inner and outer ring-bearings shown in section and separate from the other portions of the mechanism. Fig. 4 is a cross-section of Figs. 2 and 3, cut through the clutch F E. Fig. 5 is a longitudinal section of the center cylindrical sleeve which embraces and holds in place 2 and 4. Fig. 6 is the counter or treadle axle with its sprocket-wheels Q and R.

Similar letters refer to similar parts throughout the several views.

As will be noticed by referring to Fig. 1, I provide a double set of balls, bearing-rings, and sleeves, and it is in this particular that my improved bicycle differs from the ordinary ball-bearing machine.

Instead of a single sprocket-wheel on the treadle-axle I provide two wheels Q and R, which drive, by means of the usual chain band, two other wheels secured one, C, to sleeve-bearing F and the other, D, to outer sleeve or wheel-hub H, thereby providing a differential speed to the two sets of balls.

The operation of the system can be readily understood from the drawings. The driven wheel C is secured to the sleeve F, which transmits its motion through the clutch to sleeve E, forming a continuous sleeve with ring-bearings at M, which bear against the balls forming an inner moving bearing for the outer sleeve or wheel-hub H to bear against on balls $i$, which are held in place by the curved rings $l$ and $t$, this hub H being driven by the sprocket D, say, at two hundred revolutions, while the bearing it is resting on through the medium of the balls is itself moving at the rate of 66.66 revolutions, thus producing a perfect compound ball-bearing.

A small space is provided between the abutting ends of the clutches E and F to allow for lateral adjustment, to take up the loss of motion occasioned by the wear of the balls. This is accomplished by simply screwing up the bearing-nuts N, which are threaded onto the axle.

I am aware that prior to my invention bicycles have been made with ball-bearings. I do not therefore claim such a combination broadly; but What I do claim as my invention is—

The combinations of two different-sized sprocket-wheels one at each end of the crank-shaft, two rear sprocket-wheels one on the hub of the rear wheel and the other fixed to one end of a two-part sleeve journaled upon the rear fixed axle and upon which the rear wheel is journaled, chains for said sprocket-wheels, the two-part sleeve being formed with inner clutch-faces which engage so as to lock but permit of longitudinal relative movement to permit adjustment of the bearings, which are composed of double sets of spherical balls, a central cylindrical sleeve to hold the two parts of the clutch-sleeve in alinement substantially as described.

JOHN HALMAN FELTHOUSEN.

Witnesses:
PATRICK J. HIGGINS,
FRANCIS M. HAGAN,
PERCY NORTON.